United States Patent Office 3,483,367
Patented Dec. 9, 1969

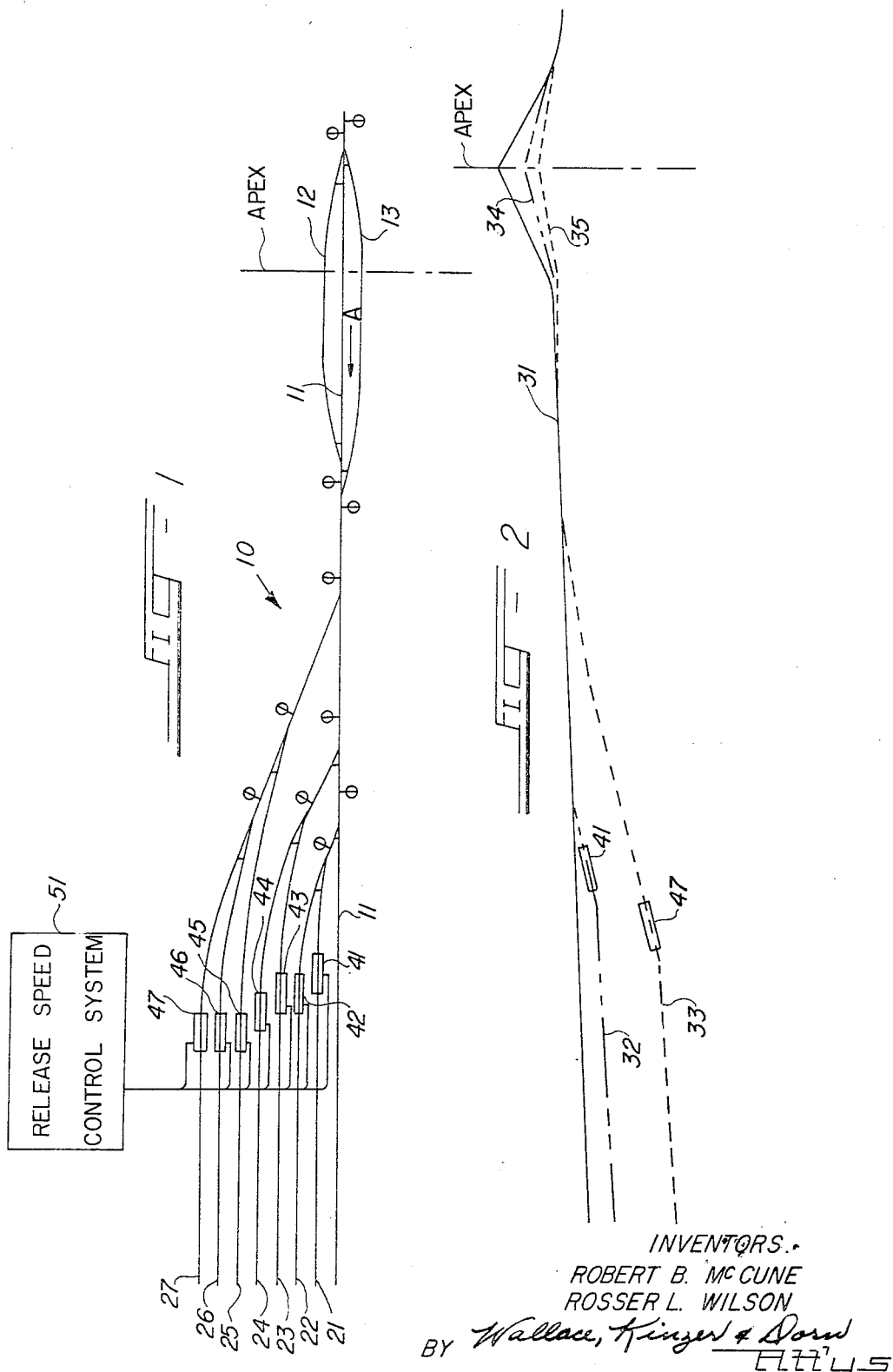

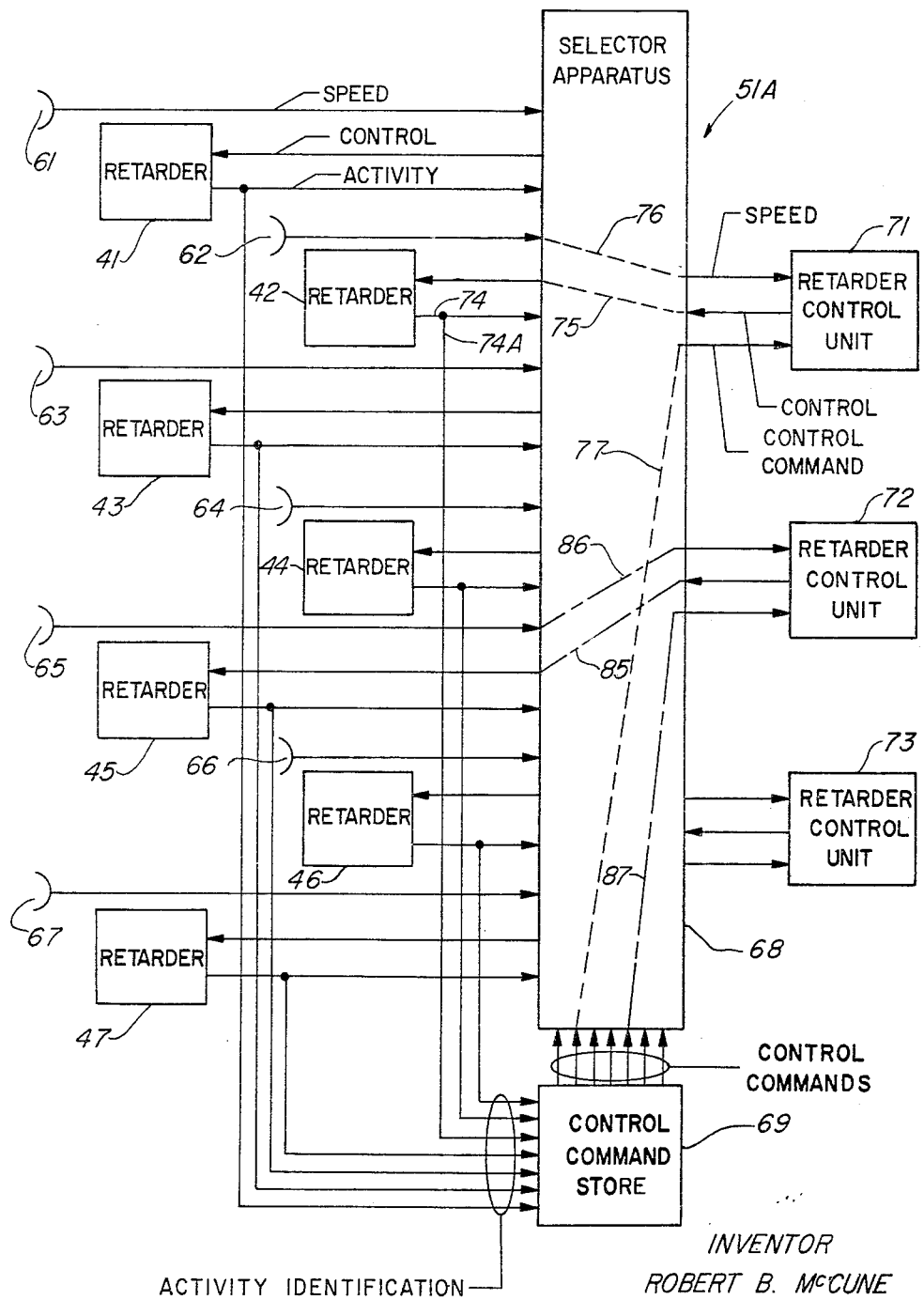

3,483,367
RAILROAD CLASSIFICATION YARD CONTROL SYSTEM
Robert B. McCune, Allendale, and Rosser L. Wilson, Mahwah, N.J., assignors to Abex Corporation, New York, N.Y., a corporation of Delaware
Continuation-in-part of application Ser. No. 528,712, Feb. 21, 1966, now Patent No. 3,413,930, dated Dec. 3, 1968. This application Oct. 6, 1967, Ser. No. 673,369
Int. Cl. B61l 3/00, 17/00; B61h 11/00
U.S. Cl. 246—182
4 Claims

ABSTRACT OF THE DISCLOSURE

A railroad classification yard incorporating a control system using an individual track brake or retarder in each separate destination track. The yard includes a main hump track having a pronounced negative grade that is paralleled by one or more additional alternate hump tracks having different negative grades from the main track, the alternate hump tracks being used under different weather conditions. A separate car retarder is located in each individual classification track beyond the last switch leading into or from that track. A speed sensing device, which may be a Doppler radar unit, senses the speed of a vehicle moving through each retarder. The actual speed information from the speed sensing device is compared with an established safe release speed for each retarder to control actuating means that opens the retarder whenever a vehicle moving through the retarder is braked to the safe release speed for that specific retarder.

CROSS REFERENCE TO RELATED APPLICATION

This application includes a disclosure of a selective control system for railroad car retarders of the kind described more fully, and claimed, in application Ser. No. 528,712, of Robert B. McCune and Rosser L. Wilson, filed Feb. 21, 1966 now Patent No. 3,413,930 issued Dec. 3, 1968, of which this application is a continuation-in-part.

BACKGROUND OF THE INVENTION

In a railroad classification yard, sometimes referred to as a "hump" yard, it is desirable to classify freight cars at maximum speed but with a minimum of damage to the cars and their contents. In the ideal operation of a classification yard, each car is released onto its individual classification or destination track at the highest possible speed that will permit coupling to the other cars on the track without damage to the contents of the moving car or of the already stationary cars that have preceded it onto the track. The basic mode of power for the moving cars, in a hump yard, is gravity. It has long been known that there are a wide variety of factors that affect the speed of a car moving through a classification yard, in response to gravity forces; these include the weight of the car, the condition of the car bearings, the weather conditions (wind, rain, temperature), the curvature of the track, and a host of other factors.

Conventional classification yards use so-called "group" retarders to perform the principal braking functions. Thus, a group retarder supplies the principal deceleration or braking effect for a substantial number of individual tracks; it may be controlled to afford different release speeds for each separate track. Thus, the release speed for one track might be four miles per hour or less and for another track might be over five miles per hour, even though the braking for each of the two tracks would be afforded by the same retarder apparatus.

The usual approach to the regulation of classification yard operations has been to attempt to control braking of the cars in accordance with as many as possible of the varying factors that affect car speed. Generally, this has been done by feeding information pertaining to weight, weather conditions, and the like, into some form of computer apparatus to predict what has come to be known as the "rolling resistance" or "rollability" for each car or cut of cars to be classified. This approach has required quite complex computers and instrumentation systems, particularly as greater knowledge has become available with respect to the many different factors that affect car rollability. Moreover, many of these factors vary to a substantial extent, and modify each other, in rather random manner, so that accurate and consistent predictions of rollability become, in many instances, virtually impossible. Furthermore, the large size of at least some classification yards has itself contributed materially to the requirement for the use of large, complex, and expensive computers for classification yard control.

SUMMARY OF THE INVENTION

It is a primary object of the present invention to provide an effective and relatively inexpensive speed control system for a railroad classification yard that affords individual control for the release speed on each individual classification track in the yard, yet which never requires computation of the rolling resistance or rollability of a car or cut of cars classified in the yard.

Another object of the invention is to provide a new and improved speed control system for a railroad classification yard that permits each car to run at maximum speed through the yard until it actually arrives at its proper classification track, while at the same time assuring effective braking of the car to a safe release speed particularly and individually selected in relation to the requirements of each track.

Another object of the invention is to provide for input speed selection in the operation of a railroad classification yard to afford practical operation where cars are permitted to run freely through the yard until they reach their destination tracks, without incurring excessive damage or loss of time and efficiency in the yard operation.

Accordingly, the invention relates to a railroad classification yard control system, the system comprising a main entrance track having a pronounced negative grade and a plurality of classification tracks branching from the main track and from each other in varying configurations and lengths and with varying negative grades. Preferably, there are one or two alternate entrance tracks having different negative grades from the main track. The system includes a corresponding plurality of car retarders, one in each separate classification track below the last branching of that classification track, each car retarder having a sensing means associated with it for sensing the speed of a vehicle moving through the retarder. Storage means are provided for establishing a safe release speed for each retarder in accordance with the requirements of the classification track in which the retarder is located. Control means are coupled to the sensing means and to the storage means for actuating each retarder to released condition whenever a vehicle moving through the retarder has been braked to the safe release speed for the retarder.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE DRAWINGS

FIG. 1 is a simplified schematic diagram of a railroad classification yard constructed in accordance with the present invention;

FIG. 2 is an elevation profile for the classification yard of FIG. 1; and

FIG. 3 is a block diagram of one form of control apparatus that may be used in the classification yard of FIG. 1.

DESCRIPTION OF THE PREFERRED EMBODIMENT

FIG. 1 illustrates, in simplified schematic form, a railroad classification yard 10 constructed in accordance with one embodiment of the present invention. Yard 10 includes a main entrance or hump track 11 along which the cars to be classified roll in the direction of the arrow A. The main or entrance track 11 branches at several places, and the branch tracks themselves also branch, to provide a plurality of individual classification tracks 21, 22, 23, 24, 25, 26 and 27 . It should be understood that although only seven classification tracks are shown in FIG. 1, in most instances yard 10 would include a much greater number of classification tracks. Typically, the yard may include from twenty to one hundred or even more individual classification tracks. As will be apparent from FIG. 1, the individual classification tracks are of varying configurations and substantially different lengths. Moreover, the grades of the individual tracks may vary somewhat. Thus, the elevation profile for the yard in general, and specifically for track 11, is shown by the solid line 31 in FIG. 2. The elevation profile for track 21 is as indicated by curve 32 in FIG. 2; the elevation of track 27 is as indicated by line 33.

Classification yard 10 includes a plurality of individual car retarders 41–47 corresponding in number to the classification tracks in the yard. Thus, retarder 41 is located in classification track 21, retarder 42 is located on destination track 22, and so one. In each instance, the retarder is located below the last switch point or branching of the classification track so that the retarder serves one classification track only. Further the retarder, is preferably located below the last curve in the track, although this cannot always be done.

Each of the retarders 41–47 has associated therewith a sensing means for sensing the speed of a vehicle moving through the retarder. The speed sensing means, which has not been illustrated in FIG. 1 apart from the general illustration of the retarders themselves, may comprise an inexpensive Doppler radar unit of the kind used in railroad and traffic control work. Alternatively, the speed sensing apparatus may be based upon a vibration pickup directly associated with the traffic rail of the classification track, as for example, the speed sensing equipment described in Patent No. 3,240,930, issued Mar. 15, 1966 to R. E. Porter and A. R. Crawford. The speed sensing means for each of the retarders is coupled to a release speed control system 51.

The release speed control system 51 must be provided with some means for establishing a safe release speed for each of the individual retarders 41–47. Individual control is necessary because what constitutes a safe release speed for the relatively short track 27 might be rather high in relation to a somewhat longer classification track 21, on which a car may have more time to gain speed after leaving the retarder. By the same token, a safe release speed acceptable on a straight track might be unsafe on a track having a pronounced curve located below the retarder.

The particular storage means used to record a safe release speed for each of the retarders, in control system 51, is not particularly critical, but some means must be provided. By way of example, a series of adjustable potentiometers connected to an appropriate constant-voltage power supply and calibrated in volts per miles per hour could be used. A multiple-tapped power supply with encoded means for engaging a particular tap whenever a specific classification track is in use can be utilized. In fact, an almost infinite variety of means are available for establishing a basis for determination of safe release speeds for the individual retarders and their associated classification tracks. The actual initial determination of what constitutes a safe release speed for a given track can be made empirically before the system is finally placed in operation.

The release speed control system 51 is coupled back to the individual retarders 41–47. Thus, a part of the control system 51, a specific example of which is described in greater detail in connection with FIG. 3, affords control means for actuating each retarder to a released condition whenever a vehicle moving through that retarder has been braked to the safe release speed for the track on the retarded is located.

The entrance end of classification yard 10 includes, in addition to the main entrance track 11, two alternate entrance tracks 12 and 13, each having an apex at a different elevation from the apex of track 11. As shown by curve 31 in the elevation profile, FIG. 2, the initial portion of track 11 extending beyond the track apex has a considerably more pronounced negative grade than the alternate entrance track 12, the grade which is indicated by line 34. An even lesser hump grade is provided by track 13, the elevation of which is indicated by dash line 35. On a day when rolling conditions are ideal and excessive speeds might be reached using the main entrance track 11, operations may be switched to either track 12 or track 13 so that the cars moving into the classification tracks will not have unsafe high speeds at the time they reach the individual retarders 41–47.

The retarders 41–47 themselves are preferably constructed to afford varying braking forces, depending upon the weight of the individual cars braked. Weight-compensating retarders of this general type are known in the art; for example, the retarders 41–47 may be of the kind disclosed in Patent No. 3,227,246 to Rosser L. Wilson or in Patent No. 3,273,672 to F. W. Creedle et al. By using load compensating retarders in each classification track, it becomes possible to retard each car to an appropriate release speed without the necessity of costly instruments or computers for modulating the degree of braking in relation to changes in car weight.

Classification yard 10, as illustrated in FIG. 1 and described above, affords a virtually fully automated yard that can operate at maximum efficiency without requiring the weighing of cars and without entailing the use of any computer or equally complex instrumentation attempting to predict rollability of individual cars or cuts of cars. The yard can use the most simply of retarding systems, since there is no necessity for interposing a retarded to provide braking for a group of different classification tracks. Indeed, a principal and critical feature of the system is the provision of a separate retarder in each individual classification track. The cars can roll through the yard at maximum speed until they reach the retarders and are then braked to a safe release speed that is effectively adjust to fit that particular retarder and the track that it controls. The result is both improved safety and maximized efficiency in operation.

Major changes in rolling conditions are usually caused by major weather changes. A change from a hot dry condition on one day to a wet, cool condition the next day may make a substantial change in operation of the yard. In yard 10, this is not compensated by an attempt to compute or predict rollability variations. Rather, major changes in weather conditions are usually compensated by selection of different ones of the three alternate entrance tracks 11–13. Further compensation may be effected by use of alternate safe release speeds for the individual retarders.

The provision of an individual track brake or retarder in each classification yard may appear to be economically wasteful; actually, it is not. The brake mechanisms required are less expensive than the computing apparatus needed for effective control of group retarders; at the same time, the individual retarder arrangement of FIG. 1 gives closer and more effective control geared to each individual classification track.

FIG. 3 illustrates a selective automatic release speed control system 51A that may be incorporated as the control unit 51 in classification yard 10 (FIG. 1). In the apparatus illustrated in FIG. 3, individual radar speed sensing units 61–67 are shown associated with retarders 41–47, respectively. As noted above, other forms of speed sensing equipment may be used if preferred.

In the control system 51A of FIG. 3, there are three individual retarder control units 71, 72 and 73, each capable of controlling the operation of any one of the individual retarders 41–47. The number of retarder control units is much smaller than the number of retarders. Indeed, in a practical yard construction the three retarder control units 71–73 could easily control operations for twenty or more individual retarders because, at any given time, cut of cars are being braked in only a small percentage of the available classification tracks in the yard. Consequently, the control units 71–73 are not permanently connected to any of the retarders 41–47 or their associated speed sensing devices 61–67. Instead, the retarder control units are selectively connected to the individual retarders through a selector apparatus 68.

Selector apparatus 68 provides a means for connecting the retarder control units to the retarders in accordance with activity occurring at the retarders. The selector apparatus also provides a means for establishing safe release speeds for each of the retarders in accordance with the requirements of the particular classification track in which each retarder is located. The latter function is performed in part by a control command storage unit 69 which maintains a record of a previously determined safe release speed for each of the individual retarders. For more specific examples of an appropriate selector apparatus and control units that may be incorporated in the system shown in FIG. 3, reference may be had to the aforesaid Patent No. 3,413,930.

In considering operation of the selective speed control system 51A of FIG. 3, it may be assumed initially that a cut of cars approaches retarder 42. As the cut nears retarder 42, an electrical signal indicative of this activity is applied to the selector apparatus 68 by means of an appropriate circuit 74. The activity at the retarder, which may be determined by a conventional track occupancy circuit, is also signalled to the control command store 69 by an appropriate electrical connection 74A. In response to the signal from retarder 42, selector 68 identifies an idle retarder control unit; in this instance, it is assumed that control unit 71 is idle.

Once this determination has been made, selector 68 establishes operating connections from control unit 71 to retarder 42 and to its speed sensor 62 as indicated by the dash lines 75 and 76, respectively, in FIG. 3. The electrical connection 75 transmits control information from control unit 71 to retarder 42. More specifically, circuit 75 is used to actuate retarder 42 to release condition whenever the car moving through the retarder has been braked to safe release speed. The electrical connection 76 supplies speed information to control unit 71, so that the control unit has a means for determining when a safe release speed has been reached. In addition, an electrical connection 77 is completed from the control command store 69 to control unit 71 to supply the control unit with the requisite information as to the permissible release speed for retarder 42. It is thus seen that control unit 71, while connected to the control command store 69 and retarder 42 as shown in FIG. 3, affords a complete control and actuating means for the retarder.

While the first cut is still passing through retarder 42, a second cut may approach retarder 45. The track detector or occupancy circuit of retarder 45 signals this activity to the selector apparatus 68 and to the control command store 69 as before. Selector apparatus 68 establishes the necessary operating connections 85, 86 and 87 for retarder 45, its associated speed sensing device 65, and command store 69 to the next available control unit, assumed to be control unit 72. The release speed in this instance may be the same for retarder 42 but probably would be different, particularly since track 22 on which retarder 42 is located is long and straight and track 25 on which retarder 45 is located is short and curved (see FIG. 1). The electrical connections for retarder 45, under these circumstances, are shown by phantom lines within selector apparatus 68. Dash and phantom lines have been used to illustrate the electrical connections in the selector apparatus because the connections are temporary in nature and are maintained only while a cut is moving through a retarder. In subsequent cycles of operation any one of retarders 41–47 may be connected, at any given time, to any one of control units 71–73.

With a selective control system of the kind shown in FIG. 3, complete control for a large number of separate retarders can be exercised at a minimum cost for the speed comparison and control actuation apparatus for the retarders. The resulting system provides maximum efficiency in operation, as discussed above, while at the same time reducing the cost of the overall classification yard in comparison with conventional computer controls and like systems based upon attempts to determine rolling resistance or rollability of individual cars. The system does not require the prediction of functions that vary at random and from car to car and is able to handle virtually any change in operating conditions.

We claim:

1. A railroad classification yard control system comprising:
    a main entrance track having a pronounced negative grade;
    a plurality of classification tracks branching from said main track and from each other, in varying configurations and lengths, and with varying negative grades;
    a corresponding plurality of car retarders, one in each separate classification track below the last branching of that classification track;
    a corresponding plurality of sensing means, one for each retarder, for sensing the speed of a vehicle moving through each retarder;
    storage means for establishing a safe release speed for each retarder in accordance with the requirements of the particular classification track in which the retarder is located;
    control means, coupled to said sensing means and said storage means, for actuating each retarder to released condition whenever a vehicle moving through that retarder is braked to the safe release speed for the retarder; and
    at least one alternate entrance track connected to said main track above said classification tracks, said alternate entrance track having a substantially different negative grade from said main entrance track.

2. A railroad classification yard control system according to claim 1 in which there are two of said alternate entrance tracks, having substantially different apex elevations and negative grades from each other.

3. A railroad classification yard control system comprising:
    a main entrance track having a pronounced negative grade;

a plurality of classification tracks branching from said main track and from each other, in varying configurations and lengths, and with varying negative grades;

a corresponding plurality of car retarders, one in each separate classification track below the last branching of that classification track;

a corresponding plurality of sensing means, one for each retarder, for sensing the speed of a vehicle moving through each retarder;

storage means for establishing a safe release speed for each retarder in accordance with the requirements of the particular classification track in which the retarder is located; and control means, coupled to said sensing means and said storage means, for actuating each retarder to released condition whenever a vehicle moving through that retarder is braked to the safe release speed for the retarder;

said control means comprising a plurality of individual control units, substantially smaller in number than the total number of said retarders, and selector means for connecting any one control unit to a retarder, to its associated sensing means, and to the portion of said storage means relating to that retarder only when there is activity at that retarder.

4. A railroad classification yard control system according to claim 3 in which said retarders are each weight-compensating retarders that automatically vary the braking force applied to a vehicle in accordance with the vehicle weight, and further comprising at least one alternate entrance track connected to said main track above said classification tracks, said alternate entrance track having a substantially different apex elevation and negative grade from said main entrance track.

References Cited

UNITED STATES PATENTS 3,125,315  3/1964  Kendall et al. _____ 246—182
3,234,378  2/1966  Gallacher.

ARTHUR LA POINT, Primary Examiner

G. H. LIBMAN, Assistant Examiner

U.S. Cl. X.R.

104—26